United States Patent [19]

Hiraga

[11] 4,188,113
[45] Feb. 12, 1980

[54] COPYING DEVICE WITH FACSIMILE FUNCTION

[75] Inventor: Michio Hiraga, Ebina, Japan

[73] Assignee: Fuji Xerox Co., Ltd., Tokyo, Japan

[21] Appl. No.: 950,871

[22] Filed: Oct. 12, 1978

[30] Foreign Application Priority Data

Oct. 14, 1977 [JP] Japan .................. 52/122316

[51] Int. Cl.$^2$ .................. G03B 27/48; G03B 27/50; G03B 27/70
[52] U.S. Cl. .................. 355/51; 350/6.8; 355/8; 358/206; 358/293
[58] Field of Search .................. 350/6.7, 6.8; 355/8, 355/51; 250/236; 358/285, 293, 302, 199, 216, 206

[56] References Cited

U.S. PATENT DOCUMENTS

| | | | |
|---|---|---|---|
| 3,475,760 | 10/1969 | Carlson | 350/6.8 X |
| 3,970,359 | 7/1976 | Starkweather | 350/6.8 |
| 3,973,825 | 8/1976 | Starkweather | 355/8 X |

*Primary Examiner*—Richard A. Wintercorn
*Attorney, Agent, or Firm*—Sughrue, Rothwell, Mion, Zinn and Macpeak

[57] ABSTRACT

A copy machine having a plane stationary platen for holding an original and having also capability in facsimile transmitter and receiver is disclosed. A first scanning mirror is driven in parallel with the platen surface at the same speed as a photosensitive medium. A second scanning mirror is driven synchronously at half the speed of the first scanning mirror and in the same direction. An in-mirror lens comprises a reflex mirror and a spherical lens system and a fourth fixed reflex mirror is located on the same side of both scanning mirrors vis-a-vis the in-mirror lens. It serves to reflect an image forming beam from the in-mirror lens forwards the photosensitive medium. The facsimile function uses a beam deflector comprising an in-mirror lens, a rotary polygonal mirror and a polygonal mirror driving mechanism. This additional system is disposed at a position optically equivalent to the nodal point of half of the in-mirror lens. An incident optical system directs a laser beam from a source toward the beam deflector. The beam deflected by the beam deflector is selectively directed toward either the platen surface or the photosensitive medium surface.

6 Claims, 14 Drawing Figures

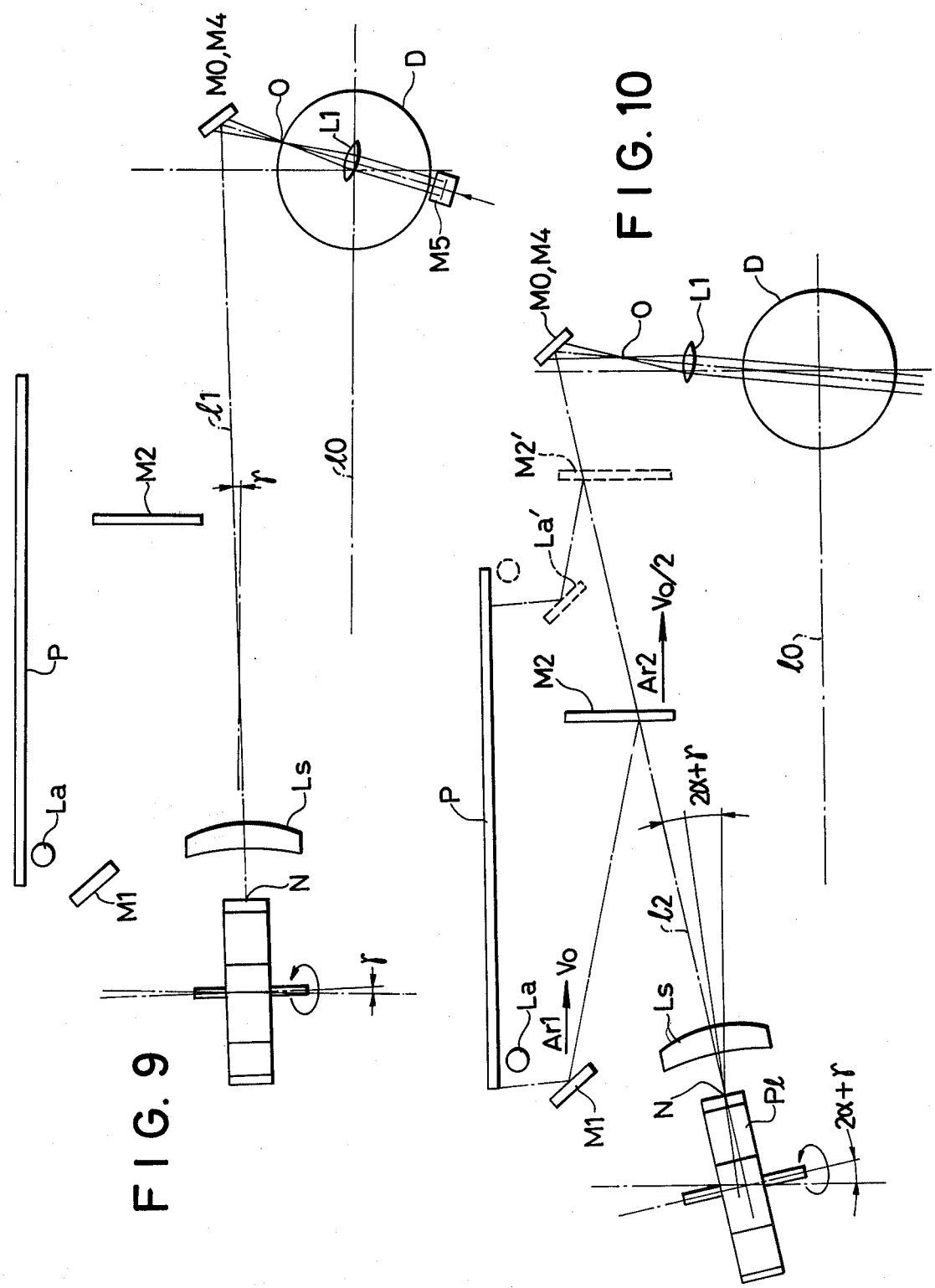

COPYING DEVICE WITH FACSIMILE FUNCTION

BACKGROUND OF THE INVENTION

The present invention relates to an improved copying machine which can implement three functions to serve as an ordinary copier, a facsimile transmitter and a facsimile receiver and is capable of selectively performing any of the three functions. The main scanning subsystem for facsimile transmission and reception is implemented by a laser beam deflector with a rotary polygonal mirror. The subsystem to scan an original for the ordinary copying function is used entirely as auxiliary scanning means including a light path with the exception of a copying lens. Hence scanning of a stationary original is rendered possible in both scanning operations in a facsimile mode and a copying mode, and two optical systems can be incorporated therein compactly.

In the prior art, a machine that is equipped with both an ordinary copying function and a facsimile function in one apparatus through application of a rotary polygonal mirror and an optical scanning means using laser technology has been proposed. Such a concept is presented in "Triple Function Box" in Technical Disclosure Bulletin Vol. 15 No. 10 (pp. 3259-3260) published in March 1973 by IBM Corporation. This prior art example, however, has a serious drawback in that the scanning technique for the copying machine is of moving platen type. This scanning method is shown in FIG. 1 where 1-$a$ and 1-$b$ herein which illustrates the initiation and termination of scanning respectively. As is clear in such a system a number of problems exist in the moving platen type. (1) At the termination of scanning, the platen protrudes from the copying machine by the distance A shown in FIG. 1-$b$, that is substantially equal to the entire platen size. This requires a larger space for installation. (2) Motion of the platen during copying operation causes a great inconvenience in practical use; and (3) High-speed scanning cannot be easily achieved since a large structure such as a platen cover is spread over the entire platen surface to support a platen glass and an original as large as JIS B4 size. It is to be moved horizontally with accuracy through a long travel distance equal to the dimension of the original.

Another drawback of this prior art example resides in the fact that the optical scanning system employing a rotary polygonal mirror and a laser and the projection lens system for the ordinary copying function are installed independently of each other in the machine and the two optical systems never share a common light path. Hence independent space is needed for each of the optical systems. Consequently, efficient use of the space in the machine becomes impossible to accomplish and it is difficult to configure the entire machine into a compact construction. Finally, the number of component parts increases to result in higher economic costs.

Yet another difficulty of the prior art is that, due to the requirement of independent light paths as mentioned above, the two optical systems must be adjusted individually and therefore render the assembly and adjustment overly complicated. Moreover, optical adjustment of the optical scanning means using a rotary polygonal mirror should be performed twice on both the original side and the photosensitive medium side, hence further complicating the procedure of optical adjustment.

SUMMARY OF THE INVENTION

Through complete elimination of the defects observed in the prior art, the present invention provides an improved multifunctional copying machine which is formed into a simple, compact structure with convenience in practical use. It is equipped with three functions to serve as an ordinary copier, a facsimile transmitter and a facsimile receiver.

Important points of this invention reside in the following points. First, when the machine is used either as an ordinary copier or a facsimile transmitter, scanning a stationary original is possible to enhance the practical convenience; second, the mechanical components and the light path of the stationary-original scanning means are usable in common for both the copying function and the facsimile function. This permits efficient use of the space in the machine, while minimizing the number of component parts increased to accomplish the required plurality of functions. The light path is used entirely in common for all functions to simplify the optical adjustment; third, the scanner for the copying function can be formed into a compact structure among some types to implement a stationary platen. The main scanning means with a rotary polygonal mirror for the facsimile function is built into the copier scanner. Thus, the copying machine according to the present invention is equipped with the above-described features and yet is a compact structure with additional advantages of low cost and easy assembly.

BRIEF DESCRIPTION OF THE DRAWINGS

FIGS. 9 and 11 show schematic diagrams to the invention;

FIG. 10 shows a schematic diagram of scanning the surface of an original;

DESCRIPTION OF THE PREFERRED EMBODIMENT

Figure 1A:
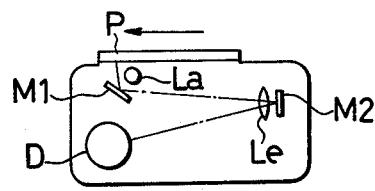
FIG. 1 is a schematic diagram showing a prior art scanning method of moving platen type.
Figure 1B:
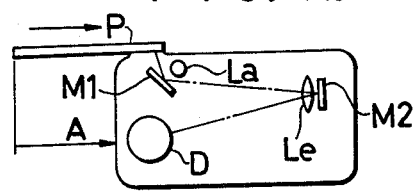
Figure 2:
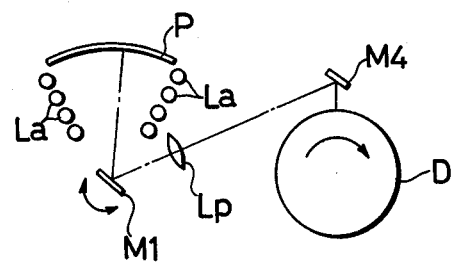
FIGS. 2 through 4 schematically illustrate scanning methods of a copying machine capable of scanning a stationary original.
Figure 3:
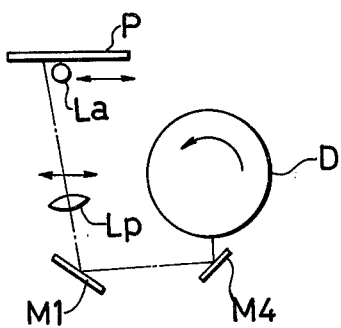
Figure 4:
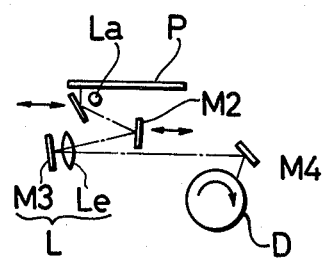

FIGS. 2 through 4 illustrate practical and typical examples used to execute stationary-original scanning in an ordinary copier mode of operation. In FIG. 2, scanning is performed by rotating a reflex mirror M1 clockwise and counterclockwise. In this mode, although high-speed motion of mirror M1 is easily attained, it is necessary that a platen P have a curved surface to form a circular arc having a center that is coincident with the center of rotation of the reflex mirror M1. As shown in FIG. 2 Lp is a projection lens, M4 is a fixed reflex mirror and D is a photosensitive drum. A pair of irradiator lamps are positioned between platen P and mirror M1.

In the example of FIG. 3, a lamp La reciprocates under a platen P, and simultaneously a lens Lp is moved at half the scanning speed of the lamp to execute scanning. Fixed reflex mirrors M1 and M4 are positioned as shown in FIG. 3.

In FIG. 4, a lamp La and a first scanning mirror M1 reciprocate at the same speed as the circumferential speed of a photosensitive drum D. A second scanning mirror M2 reciprocates in parallel with mirror M1 synchronously at half the speed of M1, thereby scanning an original. The distance between the original surface and the principal point H of an in-mirror lens L consisting of a spherical lens Le and a mirror M3 is at this time kept constant so that an original image I is formed on D through a fixed reflex mirror M4. In the copying machine, an original having a size ranging fiom JIS A4 to B4 or even to A3 should be projected at a ratio of 1:1 correctly on a photosensitive medium D. Due to restrictions in lens design and manufacturing conditions, it is a normal requirement that the focal distance of the projection lens be greater than 250 millimeters in the copiers of FIGS. 2 through 4 when adapted for stationary-original scanning. Then, the total conjugate length from the original surface to the image surface exceeds 1 meter.

Accordingly, in the composition where the light path extends in front and rear of lens Lp as in the scanning system of FIG. 2 or 3, the entire machine tends to be extremely bulky and the space for the light path in the machine is also large. In contrast, in the scanning optical system of FIG. 4 where the plane determining an incident light path and the plane determining an exit light path are on the same side with respect to the projection lens L and the two planes substantially overlap each other, the volume occupied by the entire optical system is reduced to $\frac{1}{4}$–1/5 when compared with the foregoing two examples. Hence, it is possible to form the entire machine into a very compact structure. Moreover, since the projection lens L is an in-mirror lens, the space to the left of the lens in FIG. 4 permits free addition of an auxiliary system without causing any interference to the fundamental optical system.

Fully utilizing the excellent characteristics of the scanning optical system in the copier of FIG. 4, the present invention provides a stationary-original scanning type copying machine which also employs the fundamental optical system directly as an auxiliary scanning optical system for the facsimile function without affecting the composition of the fundamental optical system at all. Therefore, with mere addition of a few parts for copier scanning machanism, the basic optical system is usable as a scanner for the facsimile transmitter and receiver as well as for the ordinary copier.

Figure 5:
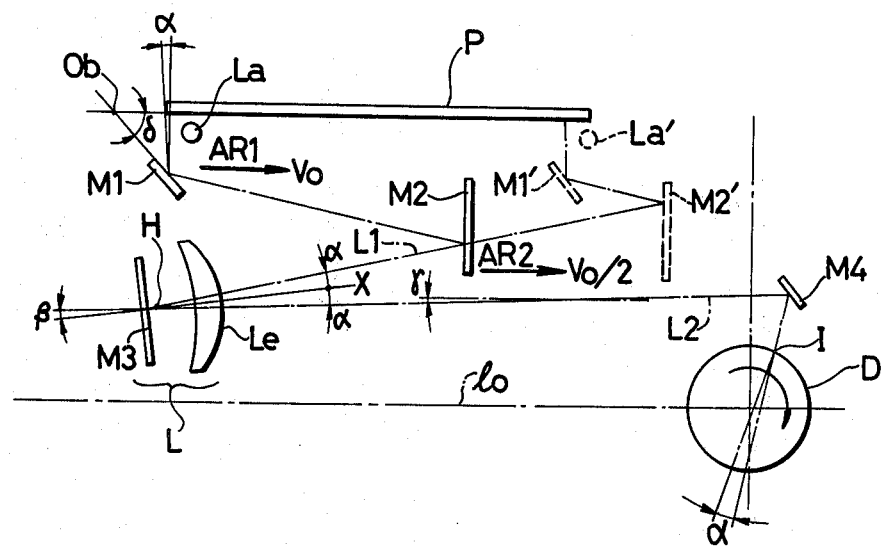
FIG. 5 shows the detailed schematic diagram of an optical system in the method of FIG. 4.

FIG. 5 shows the details of a scanning optical system employed in the copier type of FIG. 4. This is a folding optical system with an in-mirror lens, wherein the optical axis X of a lens Le is not usable to form an image since both an object field and an image field are on the same side with respect to the lens. Principal light l2 connecting an object path Ob and a principal point H through M1 and M2 is at an angle $\alpha$ with the optical axis X of lens within a paper surface. Similarly, principal light l1 connecting an image point I on a drum D and the principal point H through M4 is also at the angle $\alpha$ with the optical axis X of lens on the reverse side of the object with respect to the axis X. Therefore, l2 intersects the normal line on the platen surface at Ob while making an angle $\alpha$, and l1 also makes the same angle with the line connecting the center of drum and I. Usually M2 is disposed to be perpendicular to the platen surface.

If the angle $\delta$ formed by M1 and the platen surface is determined, the angle $\beta$ formed by X and the plane depending on P is obtained from the relationship $2\delta - \beta = 90°$. The angle $\gamma$ formed at H by l1 and the plane depending on P is obtained from the expression $\alpha + \gamma = \beta$. The proper location for the principal point H of lens is determined by taking the conjugate length, which is determined by the focal distance of L and the field angle $\alpha$, on l2 from the starting point Ob. The position and angle of M4 are decided in the manner to satisfy two conditions: (1) the conjugate length between H and I is held at determined length (2) l1 forms angle $\alpha$ at point I with the line connecting I and the center of D.

Figure 7:
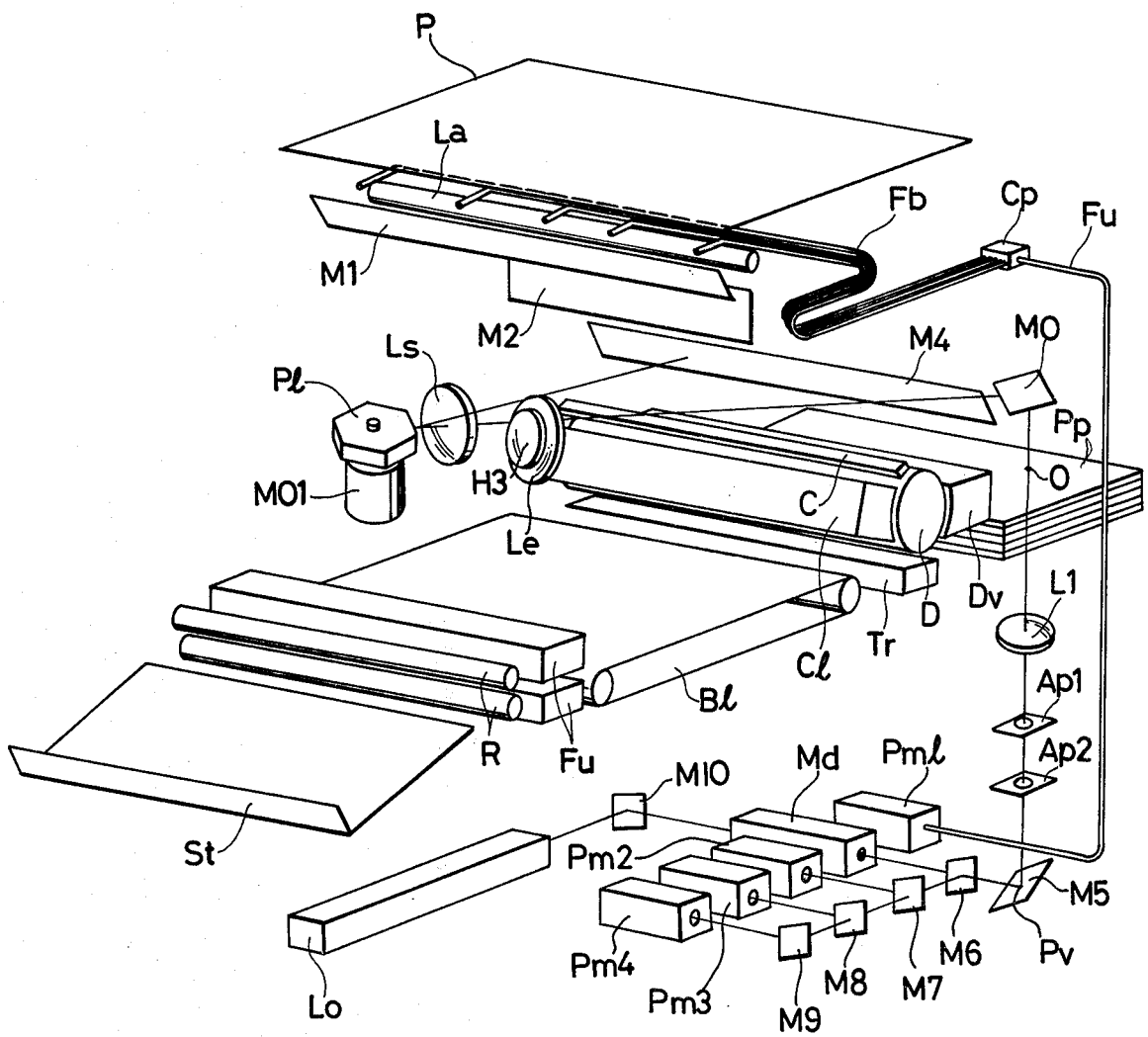
FIG. 7 is a schematic perspective view of an exemplary preferred embodiment of the invention.

In such a geometric optical system, shown in FIG. 7, high-speed linear scanning or main scanning in the facsimile mode is achieved by disposing a lens Ls and a rotary polygonal mirror Pl instead of an in-mirror lens L, as shown in a manner that an incident laser beam passing through Ls is reflected once from Pl and then exits from Ls to reach the original surface (platen surface) or photosensitive drum surface via a light path l2 or l1. If a rotary polygonal mirror Pl is so disposed as shown in FIG. 10 where the deflected beam stays within a plane that is perpendicular to the paper surface and includes l2 and a deflection point N comprising Pl and Ls in the space on the right of Ls, then the beam having passed through Ls reaches the platen surface after repeated reflection by M2 and M1 so as to execute scanning of the original surface. When scanning the photosensitive drum surface, the polygonal mirror Pl is rotated to the position shown in FIG. 9 so that the axis of deflected beam stays within a plane that includes N and l1 and is perpendicular to the paper surface.

Figure 6:
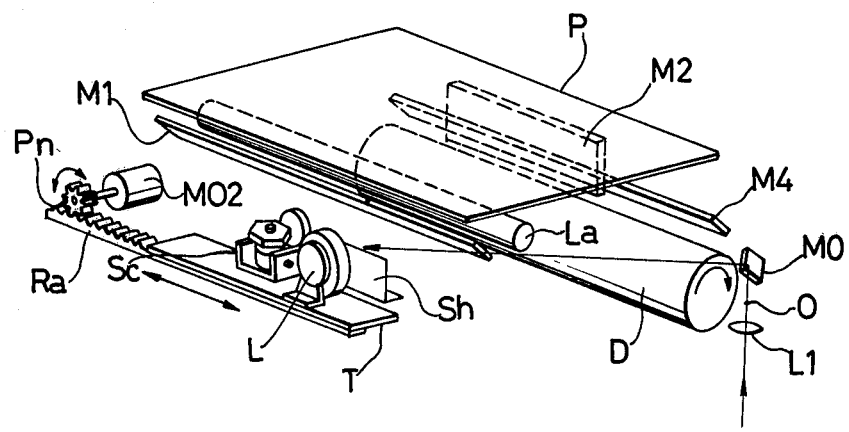
FIG. 6 schematically illustrates a subsystem for selectively switching a copying lens and an auxiliary scanner in the present invention.
Figure 8:
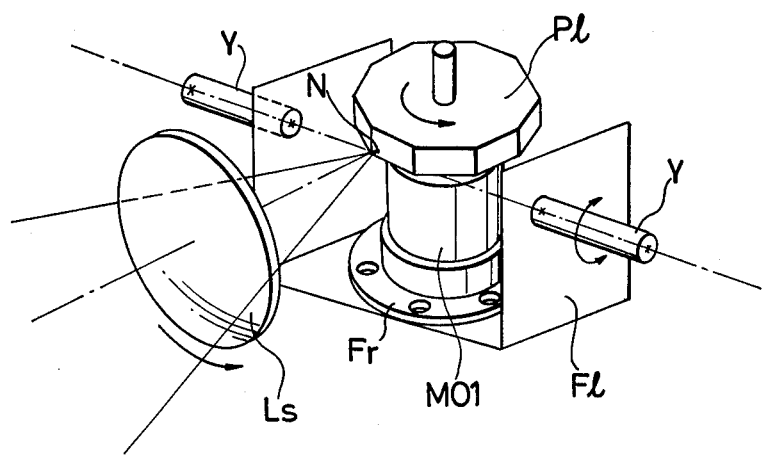
FIG. 8 is a perspective view of a rotary mechanism in an auxiliary scanner of the invention.

The invention will now be described in further detail with reference to the accompanying drawings. FIG. 6 illustrates how switching is effected between a copying mode and a facsimile mode and FIG. 7 shows the composition of an entire optical system. FIG. 8 illustrates the structure of an optical scanner with a rotary polygonal mirror, that is, a main scanner for the facsimile function.

When the machine is used in a copying mode, as schematically shown in terms of its optical system (FIG. 5), a document placed on a stationary platen P of transparent glass is irradiated by a lamp La. The document on the platen P is focused through scanning to form an image on a photosensitive drum D by means of a first scanning mirror M1 moving at the same speed as the circumferential uniform rotational speed of the photosensitive drum D and, a second scanning mirror M2 moving at half the speed of M1. Focusing continues with an in-mirror lens L comprising a half lens Le and a reflex mirror M3 so disposed as to face the original through the second scanning mirror M2 and the first scanning mirror M1. A fixed mirror M4 is employed reflecting the image-forming beam from the in-mirror lens onto the photosensitive drum D and serving to satisfy the image adjusting conditions to avoid inverting the original image.

The spatial image of the document formed on D causes imagewise discharge of a xerographic photosensitive drum D charged uniformly by a charging corotron Cl shown in FIG. 7. The image-wise charge pattern is developed by a developer Dv to form a toner image, which is then transferred onto a toner image carrier Pp (such as ordinary paper) fed synchronously with rotation of the drum D by a transfer means Tr immediately below drum D. The paper that carries the toner image is forwarded by a conveyor belt Bl to a fuser Fu, where the toner image is fixed to produce a hard copy which is then ejected to a stacker St. Ordinay copying operation is performed in this manner.

When the machine is used in a facsimile mode, a known control circuit is driven by pressing a transmission button (not shown) on a control panel or the like or in response to a dial tone obtained from a telephone circuit. In response to that initiation signal a motor Mo2 shown in FIG. 6 is energized to move a table T through cooperation of a pinion Pn mounted on a motor shaft of Mo2 and a rack Ra engaging Pn. Hence, shifting of a copying lens L from its operating position to the shadow of a shield plate Sh takes place and simultaneously, a main scanner Sc equipped with a polygonal mirror is set at the position previously occupied by the lens L when the system functions as a copier.

FIG. 7 schematically illustrates the orientation of the elements in the case of scanning a photosensitive medium, that is, in the mode of facsimile reception. A laser beam from a laser oscillator Lo is reflected by a reflex mirror M10 and is modulated by a known light modulating means Md. The beam is then introduced to a reflex mirror M5 by way of a dichroic mirror M6 which permits passage of the light of the laser oscillation wavelength but serves as a reflex mirror to light of any other wavelength. The reflex mirror M5 further directs the beam to a prefocus lens L1 which focuses the beam at point 0.

The beam diverging therefrom is reflected by a reflex mirror MO to pass through a scanning lens Ls of the main scanning optical system, and after being reflected by one surface of a rotary polygonal mirror Pl, the beam passes through Ls again and is reflected by M4 to form an image on D. When mirror Pl is driven by a motor Mo1, the beam will linearly scan on the drum D sequentialy, so that a light image is reconstructed on rotating drum D rotated in accordance with video signals which modulate Md. The subsequent process to product a hard copy from the image on the photosensitive drum is exactly the same as mentioned in relation to the copying mode. Accordingly, facsimile reception is possible by using a received video signal as the signal to modulate the laser beam.

Referring now to FIG. 9 a sectional view showing a principal part of the main scanning system is shown within a plane which passes through the optical axis l1 of Ls and is perpendicular to P. The beam incident on Ls and the beam exiting therefrom are within the same plane which, in the instance illustrated, includes a line l1 and is perpendicular to the paper surface. The position or inclination of Pl is adjusted so that the angle formed by the light path line l1 and the surface of platen P becomes the angle $\gamma$. In the optical system determined by Mo-Ls-reflection surface of Pl-Ls-M4, the point O is conjugate to the scanned point on the drum D.

FIG. 10 is the same sectional view as FIG. 9, showing the case where the machine functions as a facsimile transmitter. The incident beam and exiting beam of Ls are within the same plane which includes line l2 and is perpendicular to the surface of paper. The position or inclination of Pl in this instance is so adjusted that the angle formed by l2 and P becomes $(2\alpha+\gamma)$. In other words, Pl is further rotated by an angle $2\alpha$ from the position shown in FIG. 9. In FIG. 10, the positions of L1 and MO are changed so that the point O comes to the position conjugate to the scanned area of the original surface through the main-scanning optical system and M1, M2 in accordance with rotation of Pl from the angle $\alpha$ to the angle $(2\alpha+\gamma)$. This relationship is plotted in FIG. 12, and will be described afterward.

Video signals corresponding to the marks on the document in a facsimile transmission mode are produced by the following two examples. First, the laser beam emitted from light source Lo and having passed through Md without modulation forms a light spot on a platen P via M6, M5, L1, MO, Ls, Pl, Ls, M2 and M1. Main scanning of the original surface is executed by this light spot in accordance with rotation of a rotary polygonal mirror Pl, while auxiliary scanning is effected by M1 and M2. The reflected light representative of marks on the document is picked up by optical fiber bundles Fb arranged at suitable intervals immediately below the scanning lines of the platen surface. After being grouped by means of a coupler Cp, the light is fed through an optical fiber F to a photomultiplier tube where photoelectric conversion is performed to produce video signals. Although in the illustration Pm1 is spaced from the scanning system, it may be disposed in any other suitable place as on a carriage which conveys M1 at the scanning.

In a second technique for producing image signals, spots on the original surface irradiated preferably by a whitelight lamp La are formed into an image at the point O sequentially by main and auxiliary scanning. As shown in FIG. 7, the image thus obtained is turned into parallel light by L1, and the beam is selected through apertures Ap1 and Ap2 inserted as desired between L1 and L5, so as to collect only the light forcused in the extreme vicinity of point O. In this way, the very small spots on the document surface can be equivalently resolved. The beams having reached M5 from the original surface are substantially reflected by a dichroic mirror M6 in the direction toward M7, except the beam having wavelength close to the laser oscillation wavelength. M7 and M8 are also dichroic mirrors, while M9 may be either a total reflection mirror or a dichroic mirror.

Pm2, Pm3 and Pm4 are photomultiplier tubes. Pm2 generates video signals corresponding to color components of the original surface proportional to the spectral reflectibility of M7 from the incident beam modulated in accordance with marks on the document surface by the main and auxiliary scanning of the platen surface. Similarly, Pm3 generates video signals corresponding to the color components determined by M7 and M8, while Pm4 generates video signals corresponding to the remaining color components reflected by M7 and M8. For example, if blue, red and green dichroic mirrors known for color resolution in the color television camera or the like are used for M7, M8 and M9, image signals representing the blue, red and green components of the original are produced by Pm2, Pm3 and Pm4 respectively.

Because the system has the capability for two types of video signal generation, it becomes possible to achieve: (1) high-resolution scanning by a laser beam; and (2) generation of video signals for all colors of the document by a white light source, although with a slight reduction in the resolution as compared with the value obtained by laser beam. As a result, a variety of processes can be realized owing to generation of video signals corresponding to the individual colors of the document.

As is clear from the above description, the angle that the deflected light plane depending on Pl forms with the platen surface is $\gamma$ in a facsimile reception mode, while it is $(2\alpha+\gamma)$ in a transmission mode. Therefore, Pl should be rotated by $2\alpha$ in response to switchover from reception to transmission. For this purpose, as shown in FIG. 8, the main scanning system incorporates spherical lens Ls, mirror Pl and reflex mirror Mo1 and is held on a table T for rotation around an axis Y-Y which is perpendicular to the optical axis of Ls and also to the rotating shaft of Mo1 and passes through point N on the optical axis of Ls.

The main scanning means is supported in a stable manner to be selectively settable at either of the two rotational positions related to angles $\gamma$ and $(2\alpha+\gamma)$. Switchover is effectuated by known mechanism such as solenoid to select a desired mode where the machine functions as a facsimile receiver or a facsimile transmitter.

In this case, it is necessary that the point N coincides approximately with image of the nodal point H of the half of in-mirror lens used in a copying mode. Then the light path length from the deflection point to O becomes automatically equal to the light path length to the point I on the drum, thereby forming spots of the same quality at the two points. Consequently, focus adjustment is almost unnecessary for the main-scanning optical system.

Moreover, the operation required for switching between the transmisstion mode and the reception mode is merely the rotation axis of polygonal mirror of angel $2\alpha$, hence simplifying the mechanism and further eliminating the necessity of extra addition movement or readjustment for the auxiliary scanning mechanism.

If N and H are not brought into coincidence with each other, it becomes desirable, although not being absolutely mandatory to move the entire table T of FIG. 6 toward the drum in addition to rotation of Fl. Alternatively it is possible to move M4 toward Sc with its rotation of a minute angle or to perform both of such operations for maintaining the light path length equivalent at the switchover between the transmission and reception modes. This will, however, result in complication of the mechanism.

Figure 11:
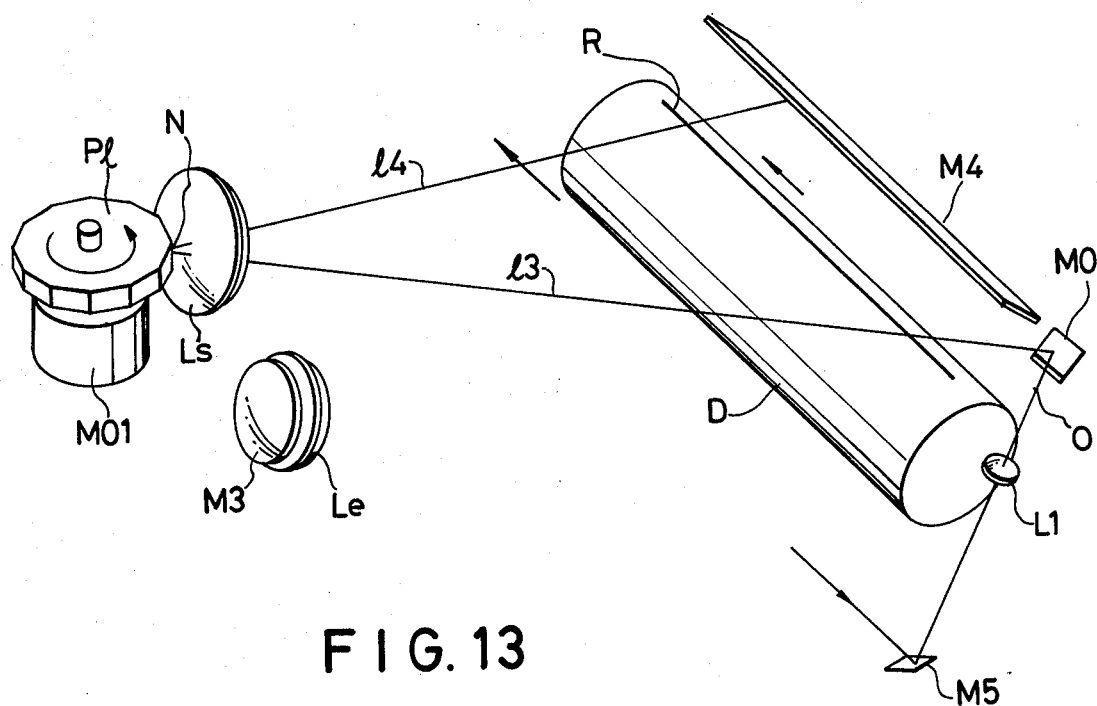

The deflected light from Sc rotates by an angle $2\alpha$ between the transmission and reception modes, but the incident beam on Sc should be within the same plane as the reflected beam. Therefore, synchronous with rotation of Pl dependent on rotation of Fl, the incident optical system comprising MO, L1 and M5 shown in FIG. 11 should move while maintaining certain conditions. These are that 13 is kept always within the same plane as the deflected beam 14, to keep constant the distance from O to Ls via MO. This enables the reflected beam from MO to be incident on the center of the incident pupil determined by the reflection surface where Ls and Pl are actuated.

Figure 12:
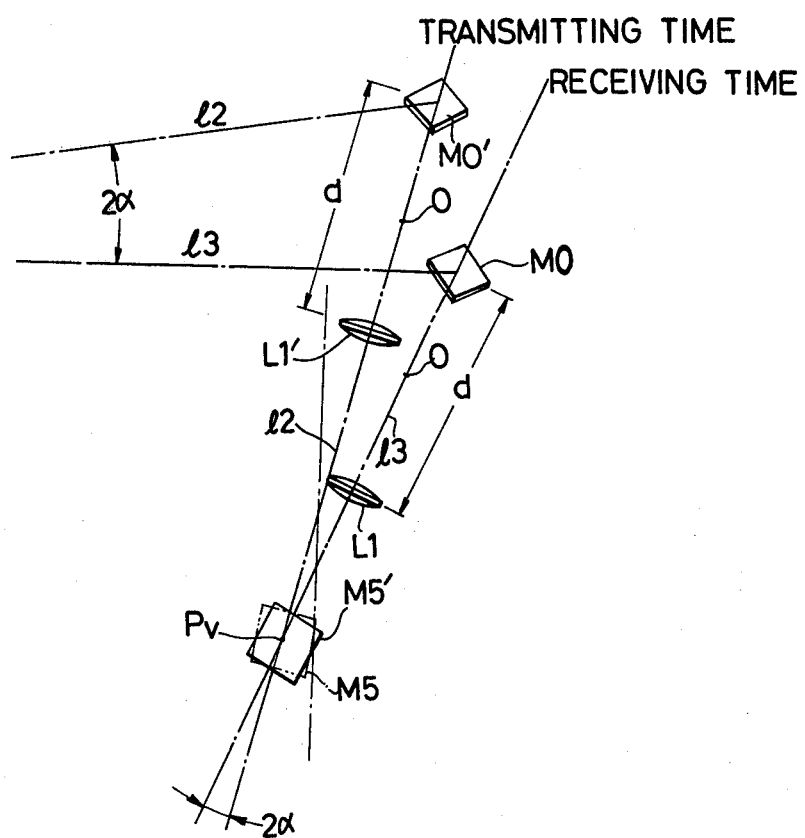
FIG. 12 illustrates switching of the incident optical system between original scanning and photosensitive-medium scanning in a facsimile mode.

FIG. 12 shows one example. When the machine function is switched from a facsimile reception mode to a transmission mode, the optical axis of the main scanner rotates by an angle $2\alpha$ toward the platen surface P to change the optical axis of incident beam 13 to 12. Then the incident optical system comprising MO, L1 and M5 in FIG. 12 rotates by $2\alpha$ within the paper surface around the center point Pv of the beam which is incident on M5 from the laser side in the direction perpendicular to the paper surface. That is, with inclination of M5 to M5', L1 and MO rotate by $2\alpha$ within the paper surface to positions L1' and MO' while maintaining the mutual distance d and the linear relationship among Pv, L1 and MO. Hence, an image O' formed by L1' is brought exactly to the position conjugate to the point on the original surface.

Figure 13:
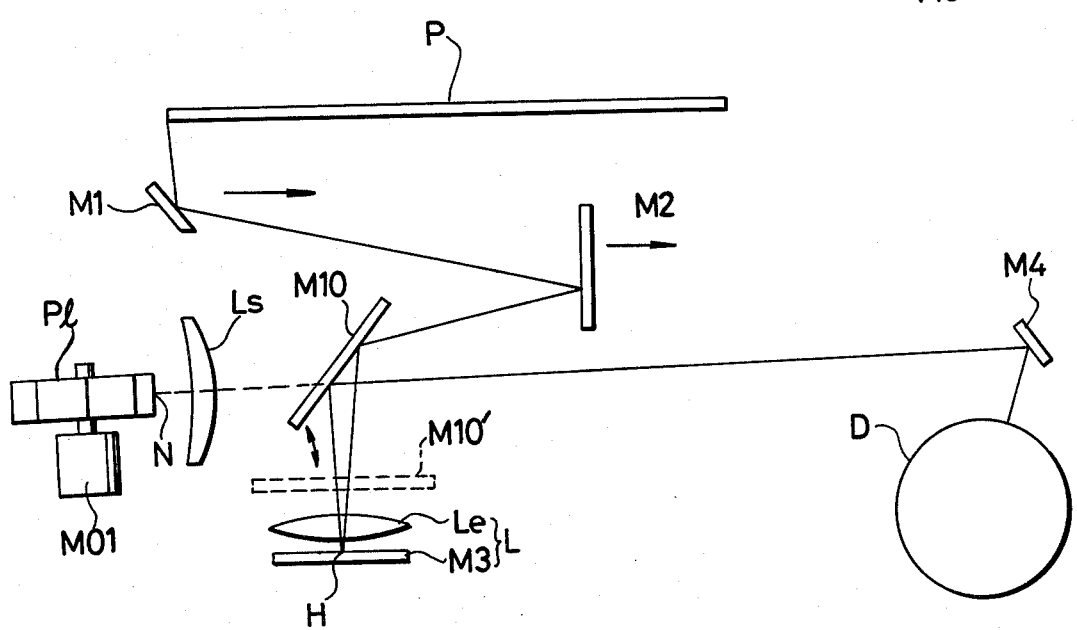
FIG. 13 shows an optical system in a second preferred embodiment of the invention.

FIG. 13 illustrates another embodiment of the present invention, wherein a copying lens L and a facsimile main-scanning optical system comprising Ls, Pl and Mo1 are adjusted so that the principal point H of a projection lens and the deflection point N serving as both the light deflection point and the rotation center of a main scanner are located at the positions to obtain a reflected image with respect to a switching mirror M10 placed in the midway of a light path. The machine functions as a copier when M10 is at the position shown by the solid line and if M10 is set at the position of M10', L is shielded from the light path. The main-scanning optical system comprising Ls, Pl and Mo1 is placed at its operating position. All other components are exactly the same as those in FIG. 7. In this structure, the mechanism can be further simplified since the sole component shifted at the mode switchover is only M10.

According to the present invention, as described hereinabove, with a minimum addition of component parts, the system is capable of equipping a copying machine with facsimile transmitting and receiving functions. Moreover, common use of an optical path eliminates complicated adjustment to accomplish a compact facsimile-combined copying machine at low manufacturing cost.

It is apparent that modifications are possible without departing from the essential scope of this invention.

What is claimed is:

1. In a copying machine having a plane stationary platen for holding a document, a photosensitive medium, a first scanning mirror driven in parallel with the platen surface at the same speed as a photosensitive medium, a second scanning mirror driven synchronously at half the speed of the first scanning mirror and in the same direction therewith, an in-mirror lens comprising a reflex mirror and a spherical lens system, and a fixed reflex mirror located on the same side as the first and second scanning mirrors with respect to the in-mirror lens and serving to reflect an image-forming beam from the in-mirror lens toward the photosensivie medium; the improvement comprising, facsimile functions means disposed in said machine having, a beam deflector comprising, a spherical lens system, a rotary polyhedral mirror, and rotary mirror driving means, said beam deflector disposed switchably at a position optically equivalent to the nodal point of the in-mirror lens; a laser source; an incident optical system for directing the laser beam from said laser source toward said beam deflector; and means for positioning said beam deflector and incident optical system so that the beam deflected by said beam deflector is selectively directed toward either the platen surface or the photosensitive medium surface.

2. The copying machine with a facsimile function as defined in claim 1, wherein said beam deflector and in-mirror lens are replaceable with each other.

3. The copying machine with a facsimile function as defined in claim 1, further comprising a switching mirror disposed to traverse the light path between the fixed reflex mirror and the in-mirror lens so that the deflection point N of the beam deflector and the principal point of the in-mirror lens are set in a positional relationship to obtain a reflected image, and said switching mirror is movable out of the light path.

4. The copying machine with a facsimile function as defined in claim 1, 2 or 3, further including light modulating means to modulate the light from the laser source by an electric signal.

5. The copying machine with a facsimile function as defined in claim 1, 2 or 3, further including, an irradiator lamp for the document, means for holding and moving said document irradiator lamp and the first scanning mirror, and optical fibers arranged at suitable intervals immediately below the platen surface anchored to said moving means and bundled in a group, said fiber bundle coupled to a photoelectric transducer to transmit image-wise optical signals obtained through linear scanning of the document surface to said transducer for conversion into video signals.

6. The copying machine with a facsimile function as defined in claim 1, 2 or 3, wherein the beam deflector is positioned to perform linear scanning of the original in cooperation with the first and second scanning mirrors, and when the reflected beams from the points being scanned on the document irradiated by the document irradiator lamp are introduced to the incident optical system, a reflex mirror is inserted in the light path extending from the incident optical system toward the laser source to permit passage only of the laser beam while reflecting all light, and the beam representing the original surface and exiting from the incident optical system is introduced to the photoelectric transducer to be converted into video signals.

* * * * *